UNITED STATES PATENT OFFICE.

HENRY BLUMENBERG, JR., OF LOS ANGELES, CALIFORNIA, ASSIGNOR, BY DIRECT AND MESNE ASSIGNMENTS, TO CARROLL ALLEN, OF LOS ANGELES, CALIFORNIA.

PROCESS OF MAKING ACID CALCIUM PHOSPHATES.

1,252,318.     Specification of Letters Patent.     Patented Jan. 1, 1918.

No Drawing.     Application filed June 7, 1917. Serial No. 173,423.

*To all whom it may concern:*

Be it known that I, HENRY BLUMENBERG, Jr., a citizen of the United States, residing at Los Angeles, in the county of Los Angeles and State of California, have invented new and useful Improvements in Processes of Making Acid Calcium Phosphates, of which the following is a specification.

My invention relates to a process of making acid calcium phosphate from phosphate rock.

The usual process of converting phosphate rock into acid calcium phosphate, the so-called superphosphate of commerce, widely used as a fertilizer, uses sulfuric acid in the reduction process.

The disadvantage of this process is that sulfuric acid is destructive to the apparatus employed and, furthermore, is not economical in the treatment of low-grade phosphate rock, for the reason that said acid will act on the impurities carried by the phosphate, such as iron oxids, calcium fluorid and aluminum silicates. The present process proposes to convert phosphate rock to acid calcium phosphate, using ammonia and carbon-dioxid as reagents, which may be regenerated and used in the succeeding cycles of operation. Again, if through any carelessness, or other cause, ammonia should be left in the acid calcium phosphate, it would not injure the product, but, on the contrary, would improve the same, since ammonium salts are valuable fertilizers, and would be paid for on analysis of the product.

My invention consists of the steps in the new process hereinafter described and claimed.

Phosphate rock is ground finely to an impalpable powder and passed through 200 mesh screen and mixed with water to form a phosphatic magma or pulp. I preferably roast the phosphate rock from three to five hours before grinding, which not only facilitates the grinding process, but also the chemical reactions of the process. The phosphatic magma is next subjected to treatment with carbon dioxid and ammonia gases, forming calcium carbonate and normal ammonium phosphate in accordance with the following:

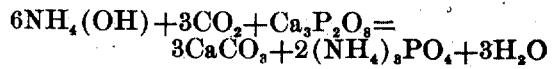

$$6NH_4(OH) + 3CO_2 + Ca_3P_2O_8 = 3CaCO_3 + 2(NH_4)_3PO_4 + 3H_2O$$

I have found that the temperature most favorable for the reaction is from 50° to 70° F. and that a pressure of 150 lbs. greatly facilitates the rapidity of the reaction. It will be understood that I do not limit myself to the temperatures or to the pressures stated.

When the reaction is complete, the mixture is filter-pressed, the calcium carbonate and other insoluble material of the phosphate rock staying in the filter-press and the ammonium phosphate staying in the filtrate. This reaction is based on the dissolving action of carbon dioxid gas on calcium phosphate, which, in the presence of ammonia, precipitates the calcium in the calcium phosphate as calcium carbonate, and the phosphoric acid radical combines with the ammonia, forming ammonium phosphate, which is readily formed when the liquors are kept alkaline by an excess of ammonia. As can be readily seen, the reaction can be kept under absolute control by the amount of ammonia and carbon dioxid gases led into the phosphatic magma or pulp. Furthermore, any of the ammonium ortho-phosphates can be produced, depending solely upon the amount of ammonia and carbon dioxid gases that are led or forced through the phosphatic magma.

After the reaction, as above described, is finished, there are three different ways of making mono-calcium phosphate:

1. Mixing the ammonium phosphate produced by the above process with a fresh batch of finely ground crude phosphate rock and boiling off the ammonia and leading the ammonia gases into a gasometer to be used in a succeeding operation.

2. Evaporating the ammonium phosphate produced by the above process to the crystallization point and mixing the crystals with finely ground crude phosphate rock, and heating the same until all the ammonia is driven off as a gas, which is collected in the gasometer, the phosphoric radical combining with the phosphate rock to produce mono-calcium phosphate.

3. Heating the ammonium phosphate formed by the above described process until the ammonia is driven off and collected in a gasometer, and mixing the remaining phosphoric acid with a finely ground crude phosphate rock to produce mono-calcium phosphate.

The reactions taking place in the three modifications of the process just described are as follows:

Various changes in the steps of the process may be made by those skilled in the art without departing from the spirit of my invention as claimed. For instance, in place of ammonia and carbon dioxid, I may use ammonium carbonate, either the normal or the acid ammonium carbonate, and carry out the succeeding steps of the process as described.

I claim:

1. A process of treating phosphate material, consisting in treating powdered calcareous phosphate material with ammonia and carbon dioxid in the presence of water, thereby forming calcium carbonate and ammonium phosphate, and separating the ammonium phosphate from the calcium carbonate.

2. A process of making acid calcium phosphate, consisting in treating powdered calcareous phosphate material with ammonia and carbon dioxid in the presence of water, thereby forming calcium carbonate and ammonium phosphate, separating said ammonium phosphate from the calcium carbonate, and mixing ammonium phosphate with powdered phosphate material and heating the same to drive off the ammonia and form acid calcium phosphate.

3. A process of treating phosphate material, consisting in subjecting powdered phosphate rock to the action of ammonia and carbon dioxid in the presence of water, thereby forming calcium carbonate and ammonium phosphate, separating the ammonium phosphate from the mixture, and heating the same to drive off the ammonia and produce phosphoric acid.

4. A process of treating phosphate material, consisting in subjecting powdered phosphate rock to the action of ammonia and carbon dioxid in the presence of water, thereby forming calcium carbonate and ammonium phosphate, separating the ammonium phosphate from the mixture, heating the same to drive off the ammonia and produce phosphoric acid, and treating powdered phosphate rock with said phosphoric acid to produce acid calcium phosphate.

5. A process of treating phosphate material, consisting of subjecting phosphate rock to the action of ammonium carbonate in the presence of water, thereby forming calcium carbonate and ammonium phosphate, and separating the ammonium phosphate from the mixture.

6. A process of treating phosphate material, consisting of subjecting phosphate rock to the action of ammonium carbonate in the presence of water, thereby forming calcium carbonate and ammonium phosphate, separating the ammonium phosphate from the mixture, and heating the same to drive off the ammonia and produce phosphoric acid.

7. A process of treating phosphate material, consisting of subjecting phosphate rock to the action of ammonium carbonate in the presence of water, thereby forming calcium carbonate and ammonium phosphate, separating the ammonium phosphate from the mixture, heating the same to drive off the ammonia and produce phosphoric acid, and mixing powdered phosphate material with said acid in proportion to produce acid calcium phosphate.

In testimony whereof I have signed my name to this specification.

HENRY BLUMENBERG, Jr.